Patented Aug. 9, 1927.

1,638,700

UNITED STATES PATENT OFFICE.

DAVID MOLOFSKY, OF VINELAND, NEW JERSEY, ASSIGNOR TO SILMO CHEMICAL COMPANY, INC., OF VINELAND, NEW JERSEY.

FISH-OIL PRODUCT AND METHOD OF MAKING THE SAME.

No Drawing.    Application filed October 23, 1926. Serial No. 143,795.

This invention relates to a powdered fish oil product and method of making the same, which fish oil product is designed for use as a stock conditioner or vitamin supplying agent or enricher for animal foods.

It is well known that various fish oils, and especially cod liver oil, are valuable for use as stock conditioning or food enriching agents because of their vitamin content, such oils containing particularly the essential A-fat soluble and D-anti-rachitic vitamins so necessary to health and growth of all farm animals and fowls. When the oil is sought to be administered, however, in the usual way, by admixture with animal foods, much of the valuable properties of the oil is lost, because of the absorption of the oil by the starch content of the food and the destruction of the vitamin content in a very short time, ordinarily within the course of two or three days. This method of use of the oil besides being wasteful does not admit of the preparation of a quantity of the foodstuff for any material period ahead of the time of use if all of the valuable qualities of the oil are to be retained.

The main object of my invention is to provide a fish oil product in the form of a powder containing the oil and its valuable vitamin constituents, in which form the valuable properties of the oil and its constituents will be preserved for a long period, and which product is designed to be mixed in its solid powdered condition with the foodstuff to be eaten therewith in the usual way, such product allowing the mixture to be prepared at any time in advance of its time of intended use.

A further object of the invention is to provide a powdered fish oil product in which the oil is mixed with and carried by a solid non-metallic mineral vehicle, having the property of holding the oil against absorption or abstraction by the food substance with which it is mixed, while at the same time permitting of the oil being readily freed in the alimentary tract of the animal.

A still further object of the invention is to provide a process of manufacture whereby the oil may be properly combined with the mineral carrier vehicle, and whereby a product having the valuable properties above described may be easily, conveniently and economically prepared.

In carrying my invention into practice, I first prepare a semi-solid batch of the mineral matter with water, the latter being used in proper quantity to obtain the desired consistency. The batch is prepared in a large wooden vat provided with a suitable agitator, such as a bladed propeller or agitator. To the batch or to the oil is added or not an alkali conditioner, such conditioner being used when large flakes are desired for the final product, or when the amount of fish oil or fish liver oil to be absorbed is equal to or less than the amount of the solid mineral. The oil is then mixed with this batch, the mixture homogenized and dried to drive off the moisture, and the solid product in powdered form collected.

The minerals suitable for use in preparing this product are non-metallic minerals, especially those of the calcium and magnesium groups, as for example, calcium carbonate, calcium palmitrate, calcium lactate, calcium gycolate, calcium saccharate, calcium hydrate, calcium oxide, calcium stearate, or other similar calcium salts or calcium minerals. Minerals of the magnesium group which may be used are magnesium carbonate, magnesium oxide, magnesium silicate, and other magnesium salts or magnesium compounds. In some cases other non-metallic minerals, such as aluminum compounds, may be used. In employing any of these minerals as an oil carrying vehicle, the method of treatment is the same, except in such cases where the material is made alkaline with an alkali conditioner, such as a solution of sodium hydroxide, where a mineral salt or compound giving off an acid re-action is used.

In the manufacture of the product employing any of the non-metallic minerals of the group noted, for example, calcium carbonate, I take 400 pounds of light, precipitated calcium carbonate and slowly add thereto 600 pounds of warm water, more or less, the amount of water being determined by the absorption quality of the mineral, and the mixture is then stirred to thoroughly incorporate the ingredients. To this semi-solid mixture thus prepared 600 pounds of cod liver oil is slowly added, the mixture being well beaten, and then 300 pounds of water are added to reduce the thickness of the mixture. The mixture is then passed through a homogenizer to break up the globules of oil and to emulsify the oil so as to hasten its absorption by the mineral vehicle, especially where the oil is employed in quantity greater than that of the mineral. Where the amount of oil is the same or less in quantity than the mineral vehicle, a suitable amount of an alkali conditioner is employed, and preferably added to the oil, before it is added to the mineral batch, the amount of the conditioner used being sufficient to make the mixture slightly alkaline, in which condition the oil is rendered more stable and its absorption by the mineral vehicle facilitated, and an additional advantage gained in that a more highly flaky final powdered product is obtained. As an example, 600 pounds of calcium carbonate is mixed with sufficient water, say of the quantity above given, to make a semi-solid mass. To this mass is then added 300 pounds of oil, with which has been previously incorporated a small quantity of sodium hydroxide, sufficient to make the mixture slightly alkaline, a suitable proportion of water then added to reduce the thickness of the mixture, and the steps above-described followed for the manufacture of the finished product.

The mixture thus prepared is allowed to flow into the box of a steam roller drier, whereby the moisture is evaporated, the finished product being a flaky powder, holding the oil with its valuable constituents unimpaired. A peculiar property of this product is that the oil is so held in the mineral that it is rendered non-absorbable by the starch or other contents of the food substance with which it is mixed, but is readily and freely absorbable and given off by the mineral vehicle in the alimentary tract of the animal.

The percentages of fish oil or fish liver oil and minerals employed may be varied within comparatively wide limits, varying from twenty-five parts of the fish oil to seventy-five parts of the mineral, up to an amount of oil, such as indicated, in excess of the amount of mineral. The degree of heat employed in the drier may vary according to the amount of material treated at a time or any figured time period of drying action, but should not exceed 150° F. at any time for a period of over five minutes.

The fish oil product thus prepared is a more or less flaky powder, from which the moisture has been evaporated, leaving the oil held in the solid mineral carrier vehicle, which powder may be easily and conveniently packed for storage and shipment and is self-preservative for a long period. Since the oil content of the powder is held in the carrier vehicle against absorption by starch or other constituents of the animal food with which it is to be admixed, the food mixture may be prepared for a long period in advance of its intended time of use, for greater convenience to the farmer or stockman, without deterioration of quality or loss of its valuable vitamin constituents. This product is highly valuable for use as a conditioner of stock or as an enriching agent containing in large proportions the A-fat soluble and D-anti-rachitic vitamins so essential and necessary to the health and growth of all farm animals and fowls.

Having thus fully described my invention, I claim:—

1. The process of making a powdered fish oil product, which consists in preparing a mixture of the oil with water and a non-metallic mineral carrier vehicle, and driving off the water and collecting the solid product.

2. The process of making a powdered fish oil product, which consists in preparing a semi-solid mixture of water and a non-metallic mineral carrier vehicle, mixing therewith the oil, homogenizing the mixture, and then driving off the water and collecting the solid product.

3. The process of making a powdered fish oil product, which consists in preparing a semi-solid mixture of water and a non-metallic mineral carrier vehicle, adding thereto the oil and an alkaline substance, homogenizing the mixture, and then driving off the water and collecting the solid product.

4. The process of making a powdered fish oil product, which consists in preparing a semi-solid mixture of water and a calcium salt, mixing therewith the oil, homogenizing the mixture, and then driving off the water and collecting the solid product.

5. A fish oil product comprising fish oil held in a non-metallic mineral carrier vehicle in powdered form.

6. A fish oil product for use as a conditioning element in stock foods comprising fish oil held in finely divided condition in a calcium salt, said product being in powdered form and adapted for admixture in such form with the stock food, the calcium salt serving as a vehicle preventing absorption of the oil by the food substance while freely liberating it for absorption in the alimentary tract of the animal.

In testimony whereof I affix my signature.

DAVID MOLOFSKY.